United States Patent [19]

Kishi et al.

[11] Patent Number: 5,498,363
[45] Date of Patent: Mar. 12, 1996

[54] ELECTRORHEOLOGICAL FLUID

[75] Inventors: Ryoichi Kishi; Hisao Ichijo; Takeshi Kitano; Masatoshi Iguchi, all of Tsukuba, Japan

[73] Assignee: Agency of Industrial Science and Technology, Tokyo, Japan

[21] Appl. No.: 338,734

[22] Filed: Nov. 9, 1994

[30] Foreign Application Priority Data

Nov. 30, 1993 [JP] Japan .................................. 5-326104

[51] Int. Cl.⁶ ............................. C09K 19/44; C09K 3/00
[52] U.S. Cl. ................... 252/79; 252/73; 252/77; 252/299.66
[58] Field of Search ................... 252/73, 77, 79, 252/572, 299.66

[56] References Cited

U.S. PATENT DOCUMENTS

| | | | |
|---|---|---|---|
| 4,462,924 | 7/1984 | Raynes | 252/299.66 |
| 5,332,522 | 7/1994 | Chen et al. | 252/299.66 |
| 5,387,370 | 2/1995 | Tomizawa et al. | 252/73 |

FOREIGN PATENT DOCUMENTS 5-119304  5/1993  Japan .

OTHER PUBLICATIONS

Chemical Abstracts, AN 114:24927, "Thermotropic liquid crystalline polymers", Kosfromin et al, 1990.

Chemical Abstracts, AN 114:43982, "Emission properties of polymer liquid crystals with side-chain mesogenic cyano-biphenyls in solution", Kurihara et al, 1991.

Primary Examiner—Christine Skane
Attorney, Agent, or Firm—Wenderoth, Lind & Ponack

[57] ABSTRACT

Disclosed is an electrorheological fluid which is a uniform mixture or solution consisting of a thermotropic polymeric liquid crystal compound such as poly(4'-cyano-4-biphenyloxyhexyl acrylate) and a thermotropic low-molecular liquid crystal compound such as 4-cyano-4'-pentyl biphenyl to serve as the solvent of the polymer in a specified molar ratio. The viscosity of the liquid composition is increased as the direct-current electric field applied thereto is increased while this electrorheological effect disappears when the temperature of the composition is increased to exceed a phase transition temperature which is specific to the respective combinations of the polymeric and low-molecular liquid crystal compounds.

5 Claims, 2 Drawing Sheets

ELECTRORHEOLOGICAL FLUID

BACKGROUND OF THE INVENTION

The present invention relates to an electrorheological liquid or, more particularly, to an electrorheological liquid having excellent uniformity and durability to be suitable for use in a wide temperature range from low to high temperatures and exhibiting controllability of viscosity not only by means of adjustment of electric field applied thereto but also by means of temperature adjustment.

An electrorheological fluid, hereinafter referred to as an ER fluid, is a liquid having a relatively high flowability at an ordinary state and imparted with a greatly increased viscosity when placed in a direct-current electric field so that it is highlighted in recent years as a novel functional material. ER fluids of the most conventional class include a suspension of fine colloidal particles such as zeolites in an electrically insulating liquid such as silicone oils.

Although such an ER fluid based on a dispersion of colloidal particles exhibits a large electrorheological effect or, namely, a large increase in the viscosity by the application of an electric field, a problem in such an ER fluid is that settling or agglomeration of the colloidal particles sometimes takes place in the fluid to cause troubles in the practical use of the fluid.

It is known that some of organic thermotropic low-molecular liquid crystal compounds exhibit an electrorheological effect and have a possibility of application as an ER fluid. Although these ER fluids have no problems in respect of the homogeneity, they have an unavoidable limitation in the increment of the viscosity by the application of a direct-current electric field as an inherency in a low-molecular compound. It is also a possible idea to employ a lyotropic polymeric liquid crystal compound dissolved in an organic solvent as an ER fluid. Such a solution-type ER fluid has a problem in respect of the stability and durability as a consequence of evaporation of the solvent or by the absorption of moisture from the atmospheric air.

Under these circumstances, it is eagerly desired to develop an ER fluid having excellent homogeneity and durability and capable of exhibiting a large electrorheological effect.

SUMMARY OF THE INVENTION

The present invention accordingly has an object to provide a novel electrorheological fluid having excellent homogeneity and durability and capable of exhibiting a large electrorheological effect by overcoming the above described problems and disadvantages in the heretofore known electro-theological fluids.

Thus, the electrorheological fluid of the present invention is a composition which is a uniform mixture consisting of a thermotropic high-polymeric liquid crystal compound and a thermotropic low-molecular liquid crystal compound in a specified molar ratio, preferably, in the range from 5:5 to 1:9, the molar amount of the polymeric compound referring to the monomeric units therein.

In particular, one of the preferable thermotropic high-polymeric liquid crystal compounds is a polymer represented by the general formula

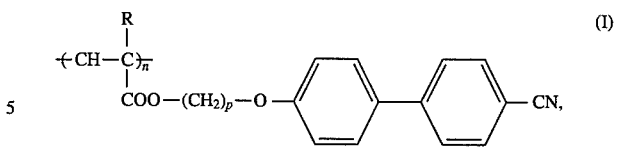

in which R is a hydrogen atom or a methyl group, the subscript p is a positive integer in the range from 2 to 10 and the subscript n is a positive integer of, preferably, at least 10 giving the degree of polymerization of the polymer. Further, one of the preferable low-molecular liquid crystal compounds to form a uniform mixture with the above mentioned polymeric compound is a compound represented by the general formula

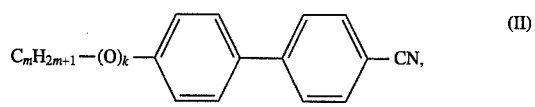

in which the subscript k is zero or 1 and the subscript m is a positive integer in the range from 4 to 12.

DETAILED DESCRIPTION OF THE PREFERRED EMBODIMENTS

Figure 1:
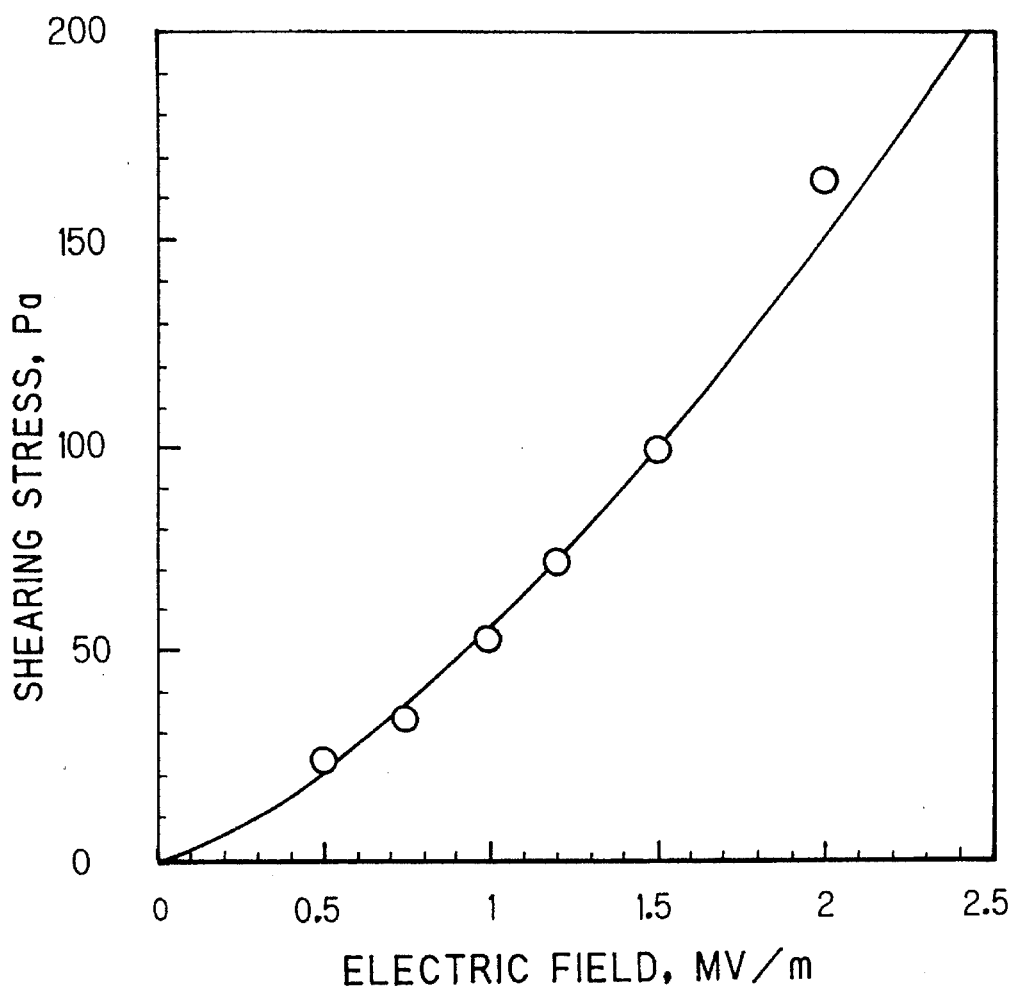
FIG. 1 is a graph showing the shearing stress in the electrorheological fluid of the invention as a function of the direct-current electric field applied thereto.

As is described above, the inventive ER fluid is a uniform mixture consisting of a thermotropic high-polymeric liquid crystal compound and a thermotropic low-molecular liquid crystal compound as a solvent for the polymeric compound. This unique ER fluid has been established in the course of the extensive investigations undertaken by the inventors with a general object to develop stimulation-responsive materials. Namely, it has been discovered that a composition consisting of a crosslinked polymeric compound having liquid crystal pendant groups and a low-molecular liquid crystal compound as a swelling agent of the crosslinked polymer exhibits deformation in the outer configuration of the swollen body when a direct-current electric field is applied thereto at a response time in a millisecond order. The mechanism of this phenomenon is presumably that application of an electric field causes orientation of molecules first in the low-molecular weight liquid crystal compound and then in the liquid crystal pendant groups of the polymeric compound. Suppression of the molecular movement in such a composite system consisting of a low-molecular liquid crystal compound and a crosslinked polymeric liquid crystal compound is necessarily accompanied by a local change in the viscosity giving a suggestion on the possibility of application of such a system to electrorheological fluids.

The inventors, directing their attention to the above described suggestive phenomenon, have conducted extensive investigations and, as a result thereof, have arrived at an unexpected discovery that application of a direct-current electric field causes a remarkable increase in the viscosity of a uniform composite system or solution consisting of a low-molecular thermotropic liquid crystal compound and an uncrosslinked thermotropic polymeric compound having liquid crystal pendant groups dissolved in the low-molecular compound leading to establishment of a composition having practical applicability as an ER fluid exhibiting an electrorheological effect of a practical high level and having excellent homogeneity and durability, of which the viscosity is controllable not only by the application of an electric field but also by the changes in the temperature.

Thus, the electrorheological fluid of the present invention is basically a uniform composition consisting of a thermotropic uncrosslinked polymeric compound having liquid crystal pendant groups and a low-molecular thermotropic liquid crystal compound as a solvent for the polymeric compound. The polymeric and low-molecular compounds to be combined into a uniform solution are required each to have good thermal stability and to be miscible with the other although they are not limited to particular compounds. One of the typical thermotropic liquid crystal polymeric compounds suitable for use in the inventive ER fluid is a poly[4'-cyano-4-biphenyloxyalkyl(meth)acrylate] represented by the general formula

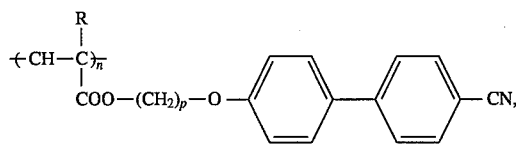

in which R is a hydrogen atom or a methyl group, the subscript p is a positive integer in the range from 2 to 12 and the subscript n, which gives the average degree of polymerization of the polymer, is a positive integer of, preferably, at least 10 or, more preferably, in the range from 30 to 3000.

The above mentioned polymeric compound of the general formula (I) can be easily prepared by the free-radical polymerization of an ester of acrylic or methacrylic acid represented by the general formula

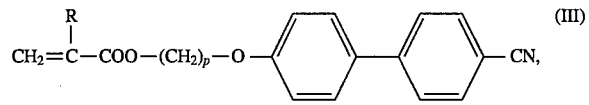

in which each symbol has the same meaning as defined above for the general formula (I), in the presence of a radical polymerization initiator such as organic peroxides, azo compounds and the like.

Examples of the thermotropic polymeric liquid crystal compound represented by the general formula (I) include: poly(4'-cyano-4-biphenyloxyethyl acrylate); poly(4'-cyano-4-biphenyloxypropyl acrylate); poly(4'-cyano-4-biphenyloxybutyl acrylate); poly(4'-cyano-4-biphenyloxypentyl acrylate); poly(4'-cyano-4-biphenyloxyhexyl acrylate); poly(4'-cyano-4-biphenyloxyheptyl acrylate); poly(4'-cyano-4-biphenyloxyoctyl acrylate); poly(4'-cyano-4-biphenyloxynonyl acrylate); poly(4'-cyano-4-biphenyloxydecyl acrylate); poly(4'-cyano-4-biphenyloxyundecyl acrylate) and poly(4'-cyano-4-biphenyloxydodecyl acrylate) as well as polymethacrylate compounds corresponding to these polyacrylate compounds. These thermotropic liquid crystal polymeric compounds can be used either singly or as a combination of two kinds or more according to need.

The thermotropic low-molecular liquid crystal compound to be combined with the above described polymeric compound is also not limitative and can be selected from a wide variety of compounds. A typical class of suitable compounds includes 4-cyano-4'-alkyl biphenyls and 4-cyano-4'-alkoxy biphenyls represented by the general formula

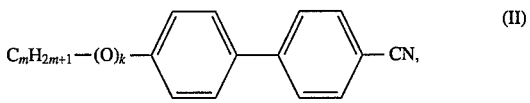

in which the subscript k is zero or 1 and the subscript m is a positive integer in the range from 4 to 12. Examples of the compounds in conformity with the general formula (II) and the definitions of the symbols include: 4-cyano-4'-butyl biphenyl; 4-cyano-4'-pentyl biphenyl; 4-cyano-4'-hexyl biphenyl; 4-cyano-4'-heptyl biphenyl; 4-cyano-4'-octyl biphenyl; 4-cyano-4'-nonyl biphenyl; 4-cyano-4'-decyl biphenyl; 4-cyano-4'-undecyl biphenyl; 4-cyano-4'-dodecyl biphenyl; 4-cyano-4'-butyloxy biphenyl; 4-cyano-4'-pentyloxy biphenyl; 4-cyano-4'-hexyloxy biphenyl; 4-cyano-4'-heptyloxy biphenyl; 4-cyano-4'-octyloxy biphenyl; 4-cyano-4'-nonyloxy biphenyl; 4-cyano-4'-decyloxy biphenyl; 4-cyano-4'-undecyloxy biphenyl and 4-cyano-4'-dodecyloxy biphenyl. These thermotropic low-molecular liquid crystal compounds can be used either singly or as a combination of two kinds or more according to need.

The above described polymeric liquid crystal compound and the low-molecular liquid crystal compound are mixed together in a molar ratio in the range from 5:5 to 1:9 or, preferably, from 4:6 to 3:7. The molar amount of the polymeric compound in the above given molar ratios refers to the molar amount of the monomeric units in the polymer. When the amount of the polymeric compound is too large, the viscosity of the composition is too high and, when the amount of the polymeric compound is too small, the viscosity of the composition is too low to exhibit the desired behavior as an ER fluid.

The thus obtained composition of the polymeric and low-molecular liquid crystal compounds, each exhibiting a behavior of a nematic liquid crystal, as an ER fluid has an isotropic phase transition temperature, above which the electrorheological effect is not exhibited. This is the reason for the controllability of the viscosity not only by the application of an electric field but also by the changes in the temperature. For example, the electrorheological effect exhibited in a composition by the application of a direct-current electric field to increase the viscosity is cancelled when the temperature of the composition is increased to exceed the phase transition temperature. The phase transition temperature of the composition consisting of the polymeric and low-molecular liquid crystal compounds depends on the types of the respective compounds and on the mixing proportion of the two components so that the phase transition temperature can be modified in a wide range according to the particular intended application.

In the following, the ER fluid of the present invention is described in more detail by way of an example, which, however, never limits the scope of the invention in any way.

Example (1) Preparation of a thermotropic polymeric liquid crystal compound:

A monomer solution was prepared by dissolving 8.00 g (22.9 mmoles) of 4'-cyano-4-biphenyloxyhexyl acrylate as a monomer and 0.0375 g (0,229 mmole) of 2,2-azobisisobutyronitrile as a polymerization initiator in a solvent mixture consisting of 12 ml of toluene and 16 ml of dimethyl sulfoxide and, after deaeration under reduced pressure, this monomer solution was heated at 60° C. for 30 hours to effect polymerization of the monomer. The solution after completion of the polymerization was added dropwise into a large volume of ether to precipitate the polymer, which was purified by several times repetition of a re-precipitation treatment with methylene chloride as the solvent and ether as the precipitant. The thus obtained polymer was poly(4'-cyano-4-biphenyloxyhexyl acrylate) and is referred to as PCBA-6 hereinafter. The polymer had a weight-average molecular weight of about 88,000 giving a value of the subscript n of about 250 in the general formula (I).

(2) Preparation of a liquid crystal composition:

A 2.32 g (6.63 mmoles calculated as monomeric units) portion of the above prepared PCBA-6 was added to 3.79 g (15.46 mmoles) of 4-cyano-4'-pentyl biphenyl, referred to as CB-5 hereinafter, in a molar ratio PCBA-6:CB-5 of 3:7 and the mixture was agitated under heating on a hot plate until a uniform mixture was obtained. When cooled down to room temperature, this mixture became cloudy and white in color. According to the examination with a polarization microscope, this mixture was found to have a nematic liquid crystal phase.

The phase transition temperature $T_{N-I}$, i.e. the transition temperature between the nematic liquid crystal phase and the isotropic phase, of this liquid crystal composition was 64.0° C. while the phase transition temperatures $T_{K-N}$, i.e. the transition temperature between the crystalline phase and the nematic liquid crystal phase, and $T_{N-I}$ of the CB-5 compound were 24.0° C. and 35.3° C., respectively, and the phase transition temperatures $T_g$, i.e. the transition temperature between the glassy phase and the nematic liquid crystal phase, and $T_{N-I}$ of the PCBA-6 polymer were 37.9° C. and 125.8° C., respectively.

(3) Electrotheological behavior of the liquid crystal composition:

The shearing stress of the liquid crystal composition prepared above was determined by using a parallel-plate rotation viscosimeter of which the plates had a diameter of 2.5 cm (Model RM-I, manufactured by Shimadzu Seisakusho) remodeled for the application of an electric voltage between the plates to serve as the electrodes. The measurement was conducted at 20° C. by applying a direct-current voltage varied up to 1 kV between the electrodes held apart at a distance of 0.5 mm.

(4) Evaluation of the electrorheological effect:

The liquid crystal composition, of which the PCBA-6:CB-5 ratio was 3:7 by moles exhibited the Newtonian fluidity. The viscosity of this liquid crystal composition was rapidly increased as the voltage was increased while the viscosity regained the ordinary value when the electric field was removed. This phenomenon was reversible and reproducible by repeating the cycles of application and removal of the electric field. FIG. 1 of the accompanying drawing shows the shearing stress in this liquid crystal composition as a function of the electric field applied between the electrodes at a constant shear rate of 13.09 s$^{-1}$. This graph indicates that the shearing stress of the liquid crystal composition was increased as the electric field applied thereto was increased giving a shearing stress of about 170 Pa when the electric field applied was 2 MV/m. In contrast thereto, the shearing stress in the low-molecular liquid crystal compound CB-5 alone was only about 3 Pa under the same electric field.

Figure 2:
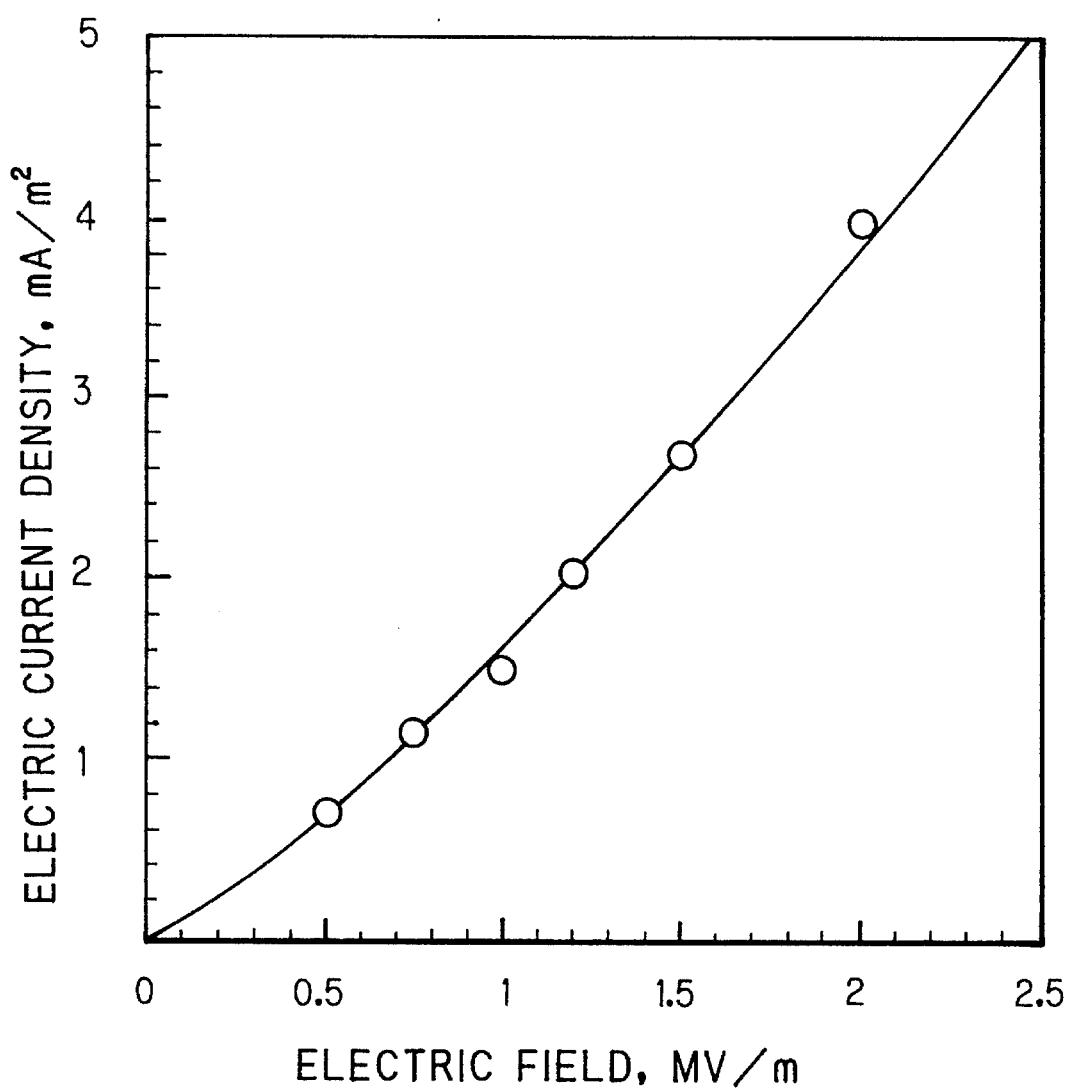
FIG. 2 is a graph showing the current density through the electrorheological fluid as a function of the direct-current electric field applied thereto.

Further, FIG. 2 shows the electric current density through the liquid crystal composition as a function of the electric field applied between the electrodes indicating that the current density was increased as the electric field was increased.

When the liquid crystal composition was converted into an isotropic phase by heating the electrode plates above the phase transition temperature, the viscosity of the composition was decreased not to exhibit the electrorheological effect. This fact supports the conclusion that the electrorheological effect in the liquid composition consisting of an uncross-linked polymeric liquid crystal compound and a low-molecular liquid crystal composition is a consequence of the changes in the molecular orientation of the respective liquid crystal compounds by the application of an electric field.

What is claimed is:

1. An electrorheological fluid which is a uniform mixture consisting essentially of a thermotropic uncrosslinked polymeric liquid crystal compound which is a poly[4'-cyano-4-biphenyloxyalkyl(meth)acrylate] represented by the formula

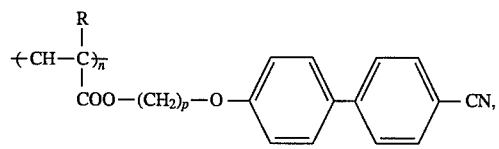

in which R is a hydrogen atom or a methyl group, the subscript p is a positive integer in the range from 2 to 12, and the subscript n is a positive integer of at least 10, and a thermotropic low-molecular liquid crystal compound which is a 4-cyano-4'-alkyl biphenyl or a 4-cyano-4'-alkoxy biphenyl represented by the general formula

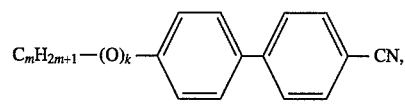

in which the subscript k is zero or 1 and the subscript m is a positive integer in the range from 4 to 12, and wherein the thermotropic polymeric liquid crystal compound and the thermotropic low-molecular liquid crystal compound are mixed in a molar ratio in the range from 5:5 to 1:9, the molar amount of the polymeric liquid crystal compound referring to the monomeric units therein.

2. The electrorheological fluid as claimed in claim 1 in which the molar ratio of the thermotropic polymeric liquid crystal compound to the thermotropic low-molecular liquid crystal compound is in the range from 4:6 to 3:7, the molar amount of the polymeric liquid crystal compound referring to the monomeric units therein.

3. The electrorheological fluid as claimed in claim 1, in which the thermotropic polymeric liquid crystal compound is a poly(4'-cyano-4-biphenyloxyhexyl acrylate).

4. The electrorheological fluid as claimed in claim 1 in which the thermotropic low-molecular liquid crystal compound is 4-cyano-4'-pentyl biphenyl.

5. The electrorheological fluid as claimed in claim 1 in which the subscript n is a positive integer in the range from 30 to 3000.

* * * * *